US008280061B2

(12) United States Patent
Foody

(10) Patent No.: US 8,280,061 B2
(45) Date of Patent: Oct. 2, 2012

(54) METHODS AND SYSTEMS FOR STORING AND RETRIEVING ENCRYPTED DATA

(75) Inventor: Patrick Foody, Birmingham (GB)

(73) Assignee: Neutrino Concepts Ltd., Birmingham (GB)

( * ) Notice: Subject to any disclaimer, the term of this patent is extended or adjusted under 35 U.S.C. 154(b) by 1231 days.

(21) Appl. No.: 11/773,778

(22) Filed: Jul. 5, 2007

(65) Prior Publication Data

US 2008/0317251 A1    Dec. 25, 2008

(30) Foreign Application Priority Data

Jun. 22, 2007 (EP) .................................... 07012286

(51) Int. Cl.
H04L 29/06 (2006.01)
(52) U.S. Cl. ........................................ 380/286; 713/189
(58) Field of Classification Search ................. 713/189; 380/286
See application file for complete search history.

(56) References Cited

U.S. PATENT DOCUMENTS

| | | | |
|---|---|---|---|
| 4,375,579 A | 3/1983 | Davida et al. | |
| 6,683,954 B1 * | 1/2004 | Searle | 380/30 |
| 7,089,425 B2 * | 8/2006 | Chan | 713/189 |
| 2003/0039362 A1 | 2/2003 | Califano | |
| 2006/0206485 A1 * | 9/2006 | Rubin et al. | 707/9 |
| 2007/0211896 A1 | 9/2007 | Mishima et al. | |

FOREIGN PATENT DOCUMENTS

| | | |
|---|---|---|
| EP | 1089194 | 4/2001 |
| EP | 1251423 | 10/2002 |
| JP | 11143780 | 5/1999 |

OTHER PUBLICATIONS

EPO Search Report in EP 07012286 (counterpart EP case), Mar. 8, 2008, Neutrino Concepts Ltd.
Communication in Counterpart EP Application No. 07012286, Mar. 3, 2008, Neutrino Concepts Ltd.
Reply to Mar. 3, 2008 Communication in Counterpart EP Application No. 07012286, Oct. 20, 2008, Neutrino Concepts Ltd.
Communication in Counterpart EP Application No. 07012286, Aug. 4, 2009, Neutrino Concepts Ltd.
Communication in Counterpart EP Application No. 07012286, Aug. 17, 2009, Neutrino Concepts Ltd.
Reply to Aug. 4, 2009 Communication in Counterpart EP Application No. 07012286, Dec. 2, 2009, Neutrino Concepts Ltd.
IPRP in Counterpart PCT Application No. PCT/GB2008/002136, Dec. 22, 2009, Neutrino Concepts Ltd.
Schneier, "Cryptographic Protection of Databases," Applied Cryptography, Para 3.8 (Jan. 1, 1996).

* cited by examiner

Primary Examiner — Jeffrey Pwu
Assistant Examiner — Michael D Anderson
(74) Attorney, Agent, or Firm — James Trosino

(57) ABSTRACT

A system for encrypting data comprising a computer configured to encrypt a plurality of data entries using at least one encryption algorithm and a system memory, wherein the computer is configured to use different keys with the encryption algorithm(s) for each data entry and the system is configured to store in the system memory or transmit for storage in an external memory the encrypted data corresponding to each entry along with an identifier corresponding to at least part of the key used to encrypt that entry, such that when decrypting a data entry in the system or external memory the associated identifier can be used to locate at least part of the correct key.

27 Claims, 7 Drawing Sheets

Figure 4a

| Row | Col1 | Col2 | Col3 | Col4 |
|---|---|---|---|---|
| 1 | | | | |
| ... | ...... | ......... | ......... | ......... |
| 75 | ABCED | DEFGH | 1234 | XY |
| 76 | 0ABDE | - | - | - |
| .... | | | | |
| uu | | | | |

Figure 4b

| Row | Col1 | Col2 | Col3 | Col4 |
|---|---|---|---|---|
| 1 | | | | |
| ... | ...... | ......... | ......... | ......... |
| 75 | ABC | 1234567 | FGHJ | 5678 |
| 76 | - | - | - | - |
| .... | ... | ... | .. | .. |
| uu | .. | ... | ... | . |

Figure 4c

| Row | Col1 | Col2 | Col3 | Col4 |
|---|---|---|---|---|
| 1 | | | | |
| ... | ...... | ......... | ......... | ......... |
| 75 | 7890 | vb | cnm | 1g4h |
| 76 | - | - | - | - |
| .... | ... | ... | .. | .. |
| uu | .. | .. | .. | . |

Figure 5

| Array Matrix | Attribute | Col1 | Col2 | Coly3 | Col4 | Random Array | Random Array Start Pos |
|---|---|---|---|---|---|---|---|
| Array-A | Random Length | 5 | 4 | 6 | 2 | 1,4 | 4,10 |
| | Mem Size | 99 | 99 | 99 | 99 | | |
| Array-B | Random Length | 3 | 7 | 4 | 4 | 2,4 | 12,18 |
| | Mem Size | 99 | 99 | 99 | 99 | | |
| Array-C | Random Length | 4 | 2 | 3 | 5 | 2,3 | 22,28 |
| | Mem Size | 99 | 99 | 99 | 99 | | |

METHODS AND SYSTEMS FOR STORING AND RETRIEVING ENCRYPTED DATA

REFERENCE TO RELATED APPLICATIONS

This application claims priority from European Patent Application Serial No. 07012286.6, filed 22 Jun. 2007, which is incorporated by reference herein in its entirety.

BACKGROUND

This invention relates to methods of encrypting data and systems for storing and retrieving encrypted data in particular a method of creating and storing keys for use in encrypting data.

It is known to encrypt data using various encryption algorithms such as the block cipher known as Advanced Encryption Standard (AES). Such algorithms apply a series of steps to the data to encrypt them using a key to determine the manner of the steps or the order in which the steps are undertaken. With a symmetric key system the same key is then used to decrypt the data. It is also known to have asymmetric key (public-key) systems whereby a different key is used to encrypt and to decrypt.

On a basic level a key could be used, for instance, to refer to a series of different substitutions ciphers. A substitution cipher is where each letter in the original unencrypted text, often called 'plaintext' is substituted for a different letter or number in a pre-determined manner. It is possible to use several different substitution ciphers. If each different substitution cipher is given a letter as an identifier, a key word of several letters can therefore refer to which cipher should be used in which order on the plaintext to create encrypted text, often known as 'ciphertext'. With such a system part of the security of the encryption will be in having secrecy of the substitution ciphers as well as the key itself. Today it has become common to use publicly available algorithms such as AES whereby the security is entirely in keeping the key secret since the algorithm itself is widely available. AES is frequently used due to compliance with Federal Information Processing Standards Provided the key is kept secret such algorithms can be effective in encrypting one particular large set of data. There are various methods to attempt to decrypt the data without the knowledge of the key, sometimes called a "hack" or "cryptanalysis attack." One method is a so called brute force attack whereby each possible key is tried. Provided the key is sufficiently long then the power needed to perform such a brute force attack makes it unworkable. For this reason it is common to use AES with at least a 128 bit key.

However, all such systems suffer from a difficulty that once the key is known all of the data can be decrypted. It is particularly problematic with symmetric key systems if several people are required to encrypt data since all of these people have access to the key which can also be used to decrypt. In asymmetric key systems then the encrypting parties will not have knowledge of the whole of the decrypting key but any compromises in security of knowledge of the decrypting key will lead to the system being very vulnerable.

Additionally where such systems are used to repeatedly encrypt relatively small pieces of data using the same algorithm and key, the system can be compromised by the similarity in changes from plaintext and ciphertext. Data in relational databases is often created, entered and stored at the so called "atomic level" rather than a macroscopic level and in data warehouses creating and storing data at the most elemental level possible is often considered an important design philosophy to maximise flexibility. To maintain flexibility data tends to also be encrypted at the "atomic level" so that small pieces of data are individually and independently encrypted.

For example, a database can be created with a large number of customers. Each new customer will require a new database entry to be created. When created the encryption algorithm using the key is then applied. If the same data is entered in the same location and the same key is used, this will produce the same result as in a previous entry, and produce the same entry in the ciphertext. This can allow for third parties attacking the security system to look for these repeated patterns in an attempt to break the encryption. If a third party is in a position of being able to supply new customer details for encryption then every time they place a chosen word such as Jones in a particular place, such as the surname column, in a new entry then new entries will be made in the equivalent ciphertext and the third party can find a repeated pattern of Jones and from this find every entry for a person named Jones placed into the system previously. This can be used as a first line of attack to decrypt the whole system or could be used to just gain specific limited information.

For example in a database of health records each persons medical history is deemed highly confidential. By finding the encrypted form or entering the data to find the encrypted form for a particular common first name, surname and health condition it may be possible to find that particular confidential information.

SUMMARY

It is an object of this invention to improve or mitigate the above referenced problems.

According to a first aspect of the invention there is provided a system for encrypting data comprising a computer configured to encrypt a plurality of data entries using at least one encryption algorithm and a system memory, wherein the computer is configured to use different keys with the encryption algorithm(s) for each data entry and the system is configured to store in the system memory or transmit for storage in an external memory the encrypted data corresponding to each entry along with an identifier corresponding to at least part of the key used to encrypt that entry, such that when decrypting a data entry in the system or external memory the associated identifier can be used to locate at least part of the correct key.

According to a second aspect of the invention there is provided a method of encrypting data comprising the steps of using a computer to encrypt a plurality of data entries using at least one encryption algorithm, using a first key to encrypt a first data entry, storing a first identifier corresponding to at least part of the first key along with the encrypted first data memory in a memory, using a second key to encrypt a second data entry, storing a second identifier corresponding to at least part of the second key along with the encrypted first data memory in a memory.

According to a third aspect of the invention there is provided a method of decrypting data comprising the steps of using a computer to locate a first identifier within an encrypted data entry corresponding to part of a key, compiling a key form the part of the key corresponding to the first identifier with a predetermined partial key or a part of the key corresponding to a second identifier located within the encrypted data, using a computer to decrypt the data using the compiled key.

Preferably wherein an identical string of characters is used as part of the key for at least two data entries. More preferably wherein the identical string is used as part of the key for each entry and/or the computer is configured not to store an identifier with the encrypted data corresponding to the identical string.

Preferably the system or method is configured to store in the system memory or transmit for storage in an external memory the encrypted data corresponding to each entry along with a plurality of identifiers corresponding to a plurality of parts of the key used to encrypt it, such that when decrypting a data entry the associated identifiers can be used to locate at least parts of the correct key.

Preferably the identical string and the part or parts of the key corresponding to the identifier or identifiers together form the complete key for the data entry with which the identifier(s) is associated and/or the identical string is compiled from a plurality of user strings of characters, and the system is preferably configured to store reference to which parts of the user strings are used to form the identical string, such as the position of the first character and number of characters, in the system memory, preferably wherein the identical string is stored in the system memory and/or wherein the system is configured to decrypt two or more data entries stored by the system and is configured so that when decrypting the user strings are required in order to be used together with the stored references to recompile the identical string to be used as part of the key for decrypting.

Preferably there is provided or used a database of strings of characters for use as at least parts of keys, the identifier for a data entry, and preferably each identifier for each entry, corresponds to a stored string that was used as at least part of the key for the entry associated with the, or preferably each, identifier. More preferably the identifier(s) for a data entry comprises the at least part of a key and/or the identifier(s) comprises a reference to the location of the at least part of key used with the database and/or a string from the database is chosen randomly to form at least part of the key for each entry encryption and/or the strings in the store are randomly generated preferably based on fixed input parameters which are preferably stored in the system memory.

Preferably a reference to the location, such as a table column number, in the database is in the system memory, preferably which is combined with an identifier for an entry, such as one that corresponds to a row number, in order to locate the at least part of a key for that entry when decrypting and/or the identifier is stored in the same format as the encysted data such as in alphanumeric format and/or the identifier for a data entry is embedded within the encrypted data entry in a position, with the position in which the identifier is embedded either stored in the system memory of the computer or calculable from the encrypted text by the computer/transmitted to be stored in external memory and/or different identifiers are embedded at different positions within the encrypted data and the different positions are stored and/or the system memory comprises a plurality of memory sources preferably with at least one memory source inside the computer and at least one remote from it connected by a communication path and/or at least part of the keys are randomly generated Preferably more than two identifiers are located and the key compiled from more than two corresponding parts.

BRIEF DESCRIPTION OF THE DRAWINGS

Embodiments in accordance with the invention will now be described, by way of example only, with reference to the accompanying drawings in which:

FIGS. 4*a*, 4*b* and 4*c* are a depiction of parts of the array of values stored in the partial key database of FIG. 1 used for encryption and decryption;

FIG. 5 is an illustration representing a specific template;

DETAILED DESCRIPTION

Figure 1:
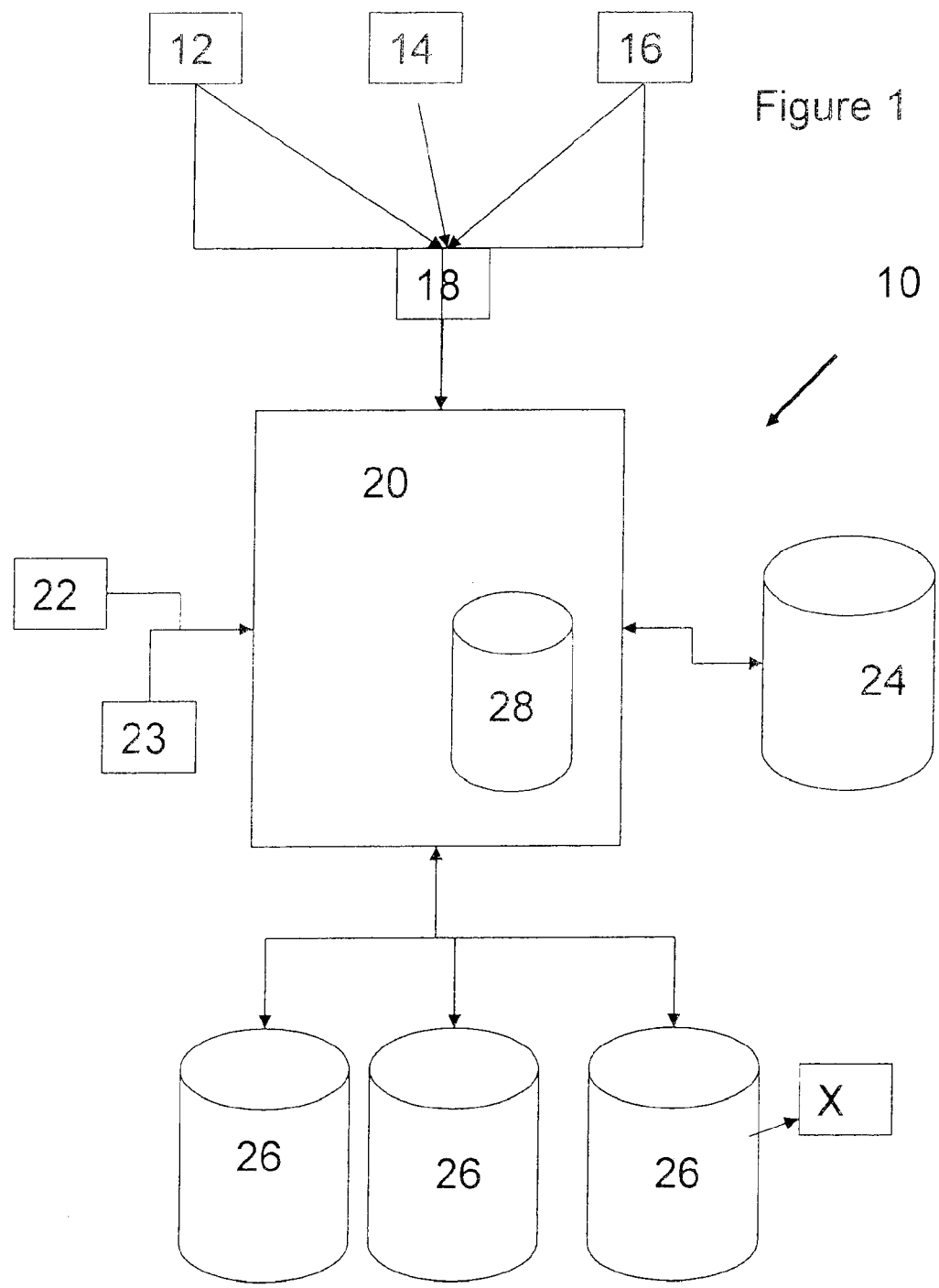
FIG. 1 is an overview of a system according to the invention.

Referring to FIG. 1 there is shown a computer system 10 comprising User A server 12, User B server 14, User C server 16, key calculator 18, encryption server 20, plaintext input 22, user input 23, partial key database 24, and a set of ciphertext databases 26. There is also shown an external computer X, that does not form part of the invention attempting to access the ciphertext database 26.

Each of the user servers 12, 14 and 16 include at least one computer with a microprocessor and may be connected to some external system. In commercial settings each of these servers 12, 14 and 16 may be owned by separate companies or divisions within a company or even just used by separate people within a division of a company, which need to use system 10 but are not in charge of administering its use. Each of the user servers 12, 14 and 16 have a communication path such as a wired or wireless network connecting them to both the key calculator 18 and the encryption server 20. Alternative embodiments may also have a further user input for each server 12, 14, and 16 or have the servers connected to the user input 23.

Key calculator 18 is programmed for the purpose of calculating a key from information provided from each of user A server 12, user B server 14 and user C server 16. It may take the form of a computer with its own microprocessor and display (not shown).

Alternatively all of components 18 can be provided in a single database instance with other components such as the ciphertext of databases 26 on one or more computers.

Encryption server 20 has at least one computer, though it can comprise several computers, and contains at least one micro-processor. Additionally encryption server 20 includes an encryption memory 28 in which data is stored. As well as having connections to the user servers 12, 14 and 16, the encryption server 20 can also receive information via connection paths from key calculator 18, both the inputs plaintext input 22 and user input 23 and has two way communication paths with both the partial key database 24 and the ciphertext databases 26.

The plaintext input 22 receives text and sends this to encryption server 20. It can be simply a communication means for moving text from external computers or can take the form of a user input device into which text can be typed.

User input 23 is a device allowing a user to send information to external encryption server 20 and may take a conventional form such as a keyboard or mouse. Preferably the encryption server 20 has a display and a user is able to input data to the user input 23 in response to requests on the display on encryption server 20 and/or is able to interact with the external computer by viewing and responding to what is viewed in the conventional manner that a software program may use a mouse.

Partial key database 24 and ciphertext databases 26 can be structured as conventional databases. The data may be stored on a storage device such as a hard drive with the data organised by a conventional database schema such as SQL or Oracle®. Either of these databases may form a single unit or a plurality of interconnected units. Again they may alternatively be part of the same database instance as other components. Here the ciphertext databases 26 are depicted as multiple databases, each of which can be in communication with each other or merely in communication directly with encryption server 20, provided that there is a mechanism and a computer program in place either at server 20 or the database 26 or additional computer which is able to inform a user reading the database which data is stored in which unit 26.

Figure 2:
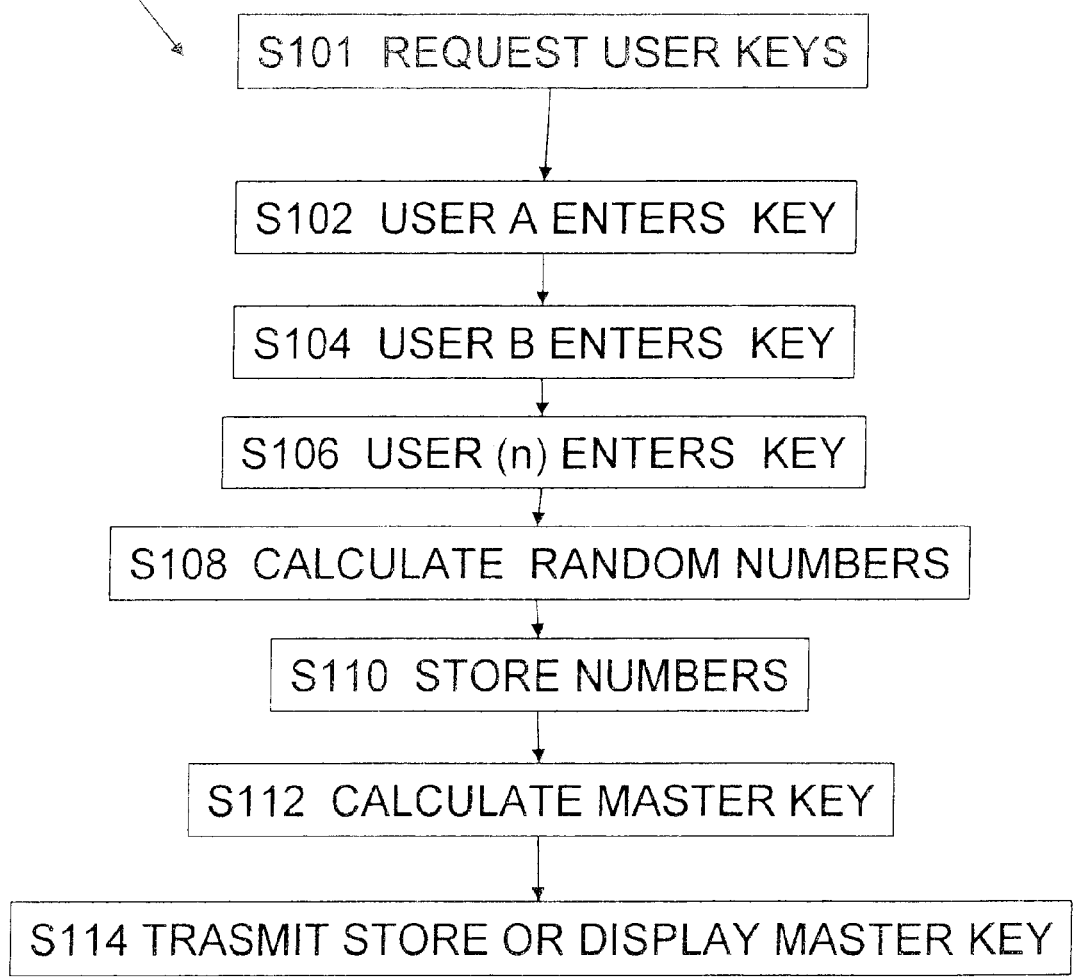
FIG. 2 is a flowchart of a process of making a master key with use of the invention.

In FIG. 2 is shown a process 100 of producing a master key. At the first step S110 the key calculator 18 requests user keys from each of servers 12, 14 and 16. This can be done via a central display connected directly to key calculator 18 or via software present on each of the servers 12, 14 and 16 which communicates with a user on each of the servers 12, 14, 16 or simply communicates directly with part of the servers in which a pre-determined user key is stored. When requesting the user keys the calculator 18 requests that the keys are of a minimum length and in a specific format, in this case a minimum of 12 characters long and using alpha numeric characters. These values can represent different values but in this case the system uses a base 32 system, each character therefore being equivalent to five binary bits.

Next at step S102 the user A server 12 enters a key which in this example is ABCDEFPATGHI, at step S104 user B server 14 enters a key which in this example is ABRICDEFGHIJK and at step S1106 user C server 16 enters a key which in this example is ABCDEFHICKJKL. At step S1108 the key calculator 18 then uses a random number generator to calculate three separate start positions with three corresponding lengths. New start positions can be any number between zero and the minimum length 12 whilst the three lengths are calculated to add to at least a pre-determined number which in this case is a minimum of 7. In a particular example at step S108 the key calculator calculates the following six numbers.

User A key, start position 7, length 3; User B key start position 3, length 2, User C key start position 8, length 2.

At step S110 these calculated values are then stored in a memory (not shown) along with a corresponding task identifier which specifies the particular task and/or set of cipherdata to which the values apply. Preferably these values are themselves encrypted to a higher level than the rest of the data since the amount is small. So for example the values may be encrypted using AES 256.

At step S112 these values are then used to calculate a master key from the three user keys, i.e., calculator 18 runs along the entered key from user A for seven characters and takes the next three characters which in this case are P, A and T. Then to add to these three characters it runs along a key from user B server 14 and it runs until the third character and takes the next character also which in this case produces R and I. Then the calculator runs along the key from user C, server 16 to the eight character and takes that and the next character also which are letters C and K. Altogether therefore a master key is built up which is PATRICK.

Then at step S114 this master key is sent to encryption server 20 for use in encrypting a set of values/or particular type of plaintext. Additionally the master key can be stored in a memory and/or can be displayed to human users of user servers A, B and C 12, 14 and 6 for them to mentally memorise. If it is allowed for the users A, B and C of servers 12, 14, 16 to humanly memorise the master key then step S110 can be skipped. In a preferred embodiment the master key is not displayed so that no single individual has access to it. In embodiments in which the master key is stored it maybe encrypted at a higher level such as AES 256.

Figure 3:
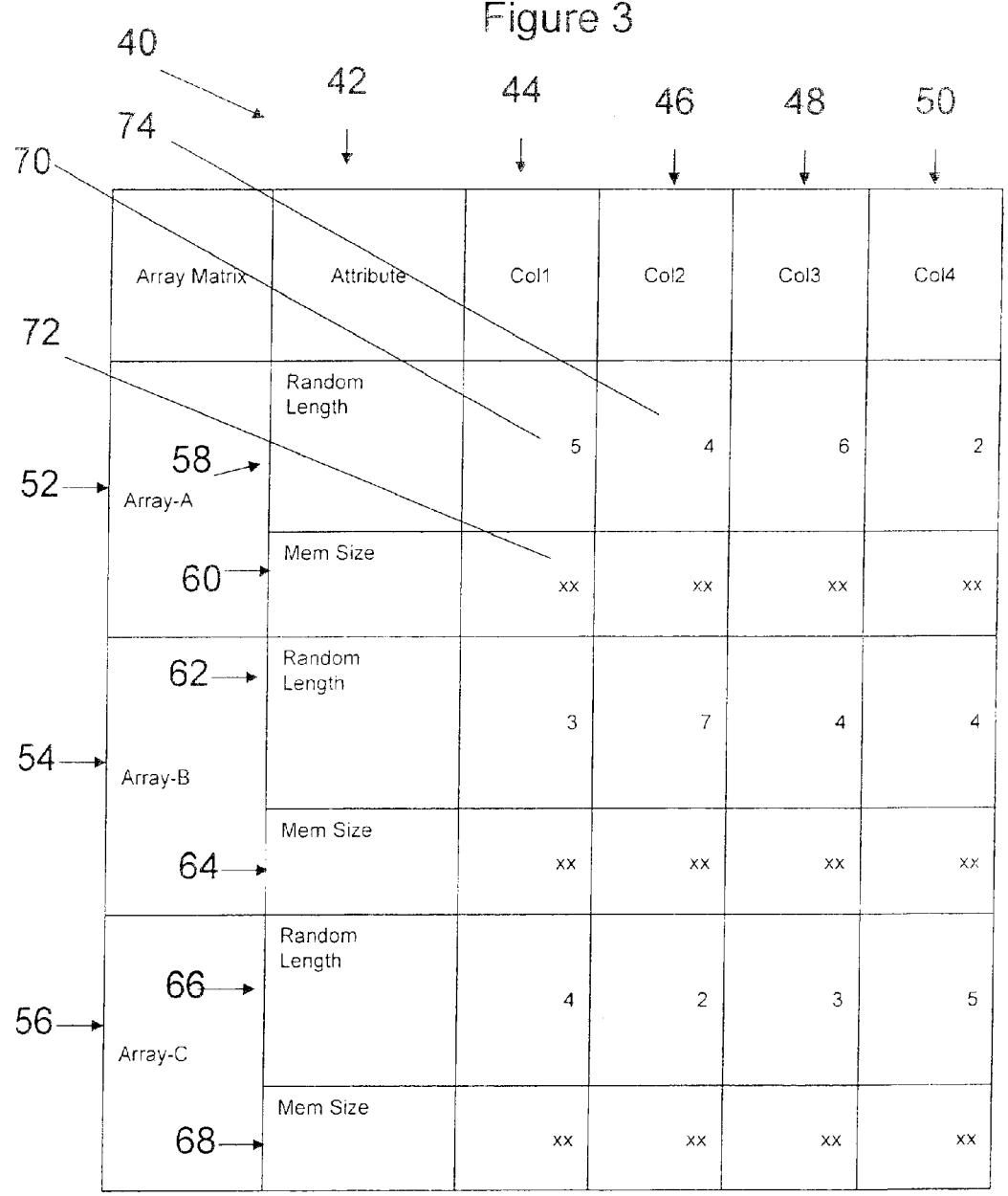
FIG. 3 is an illustration representing a template used for generation of the arrays of FIG. 4.

Referring to FIG. 3 there is shown a template 40 for development of arrays of characters for building partial keys. The template comprises five columns and three rows subdividing into six rows. The first column is an attribute column 42. The further columns are col1 44, col2 46, col3 48 and col4 50. The three rows 52, 54 and 56 correspond to three separate arrays, Array A, Array B and Array C with the rows subdividing into two for the attribute column 42 and additional columns. For each array there are two attributes of "random length" and "mem size" which provide two separate rows for each array so that there are six subrows in total. The rest of the template is then made up of values corresponding to a random length or memory size for each of col1 44, col2 46, col3 48, col4 50 and array. For example, cell 70 contains the number 5 which corresponds to the random length of array A col1 meaning that in the array described below coil 42 of Array A will contain character lengths for use as partial keys which are five characters long. Cell 72 contains value xx indicating that the number of entries in col1 42 in the generated array is up to the number of combinations of that number of characters. So in this case xx with a base 32 character system means there may be up to 10 bit combinations which is 1024 entries.

In FIG. 4a is illustrated part of array A 80 built according to template 40. Array A 80 has four columns corresponding to col1 82, col2 84, col3 86 and col4 88 and a large number of rows, in this example 1,024 (illustrated in alpha-numerics as UU) as defined by cell 72. Each row in coil 82 then contains 5 characters as defined by cell 70. A random generator then creates 1,024 sets of five characters randomly putting one in each row of coil 82. In the example illustrated the rows 75 and 76 (in base 32) are shown to be ABCDE and 0ABDE with the rest of the rows shown blank but in fact all 1,024 will be filled. Col2 84 then contains a thousand and twenty four rows of characters sequences which are four characters long as defined by cell 74. Col3 86 and col4 88 contain a thousand and twenty four rows similarly set by the entry in the random length row 58.

In FIG. 4b is shown array B 90 and in FIG. 4c is shown array C 96. Arrays 90 and 96 are substantially the same as array A 80, except the number of characters in each column is different corresponding to the different values in the random length row 62 and row 66 from template 40.

These arrays 80, 90 and 96 are generated based on template 40 and stored in the partial key database 24.

Once these arrays have been populated and stored in the partial key database 24 a specific template 40' is produced as depicted in FIG. 5. The specific template is substantially the same as template 40 (with the equivalent rows given the same reference number but with an added apostrophe) but additionally has two new columns. RA column 51 corresponds to a random array choice in which values are entered for each of array A, array B and array C rows 52, 54 and 56. A random number generator generates two numbers between 1 and the total number of columns containing numerical values which in this case is 4. These two random numbers are then stored in the specific template 40' in RA column 51 as references to the columns to be used in encryption as described below. As an example, cell 76 contains the values 1 and 4 which will instruct the system 10 when using encryption to use col1 44 and col4 50. Column 53 defines the start positions at which parts of keys will be embedded within the ciphertext as explained below. The random number generator generates two numbers for each of array, array A, array B and array C, placing them in column 53 across from rows 52, 54 and 56 respectively and picks any number between 1 and minimum length of ciphertext that will be entered.

Once created the specific template 40' is stored in encryption memory 28 with a task identifier identifying which task or particular information is stored about. This can be the same task identifier as that used with the master key by calculator 18 at step S110.

Figure 6:
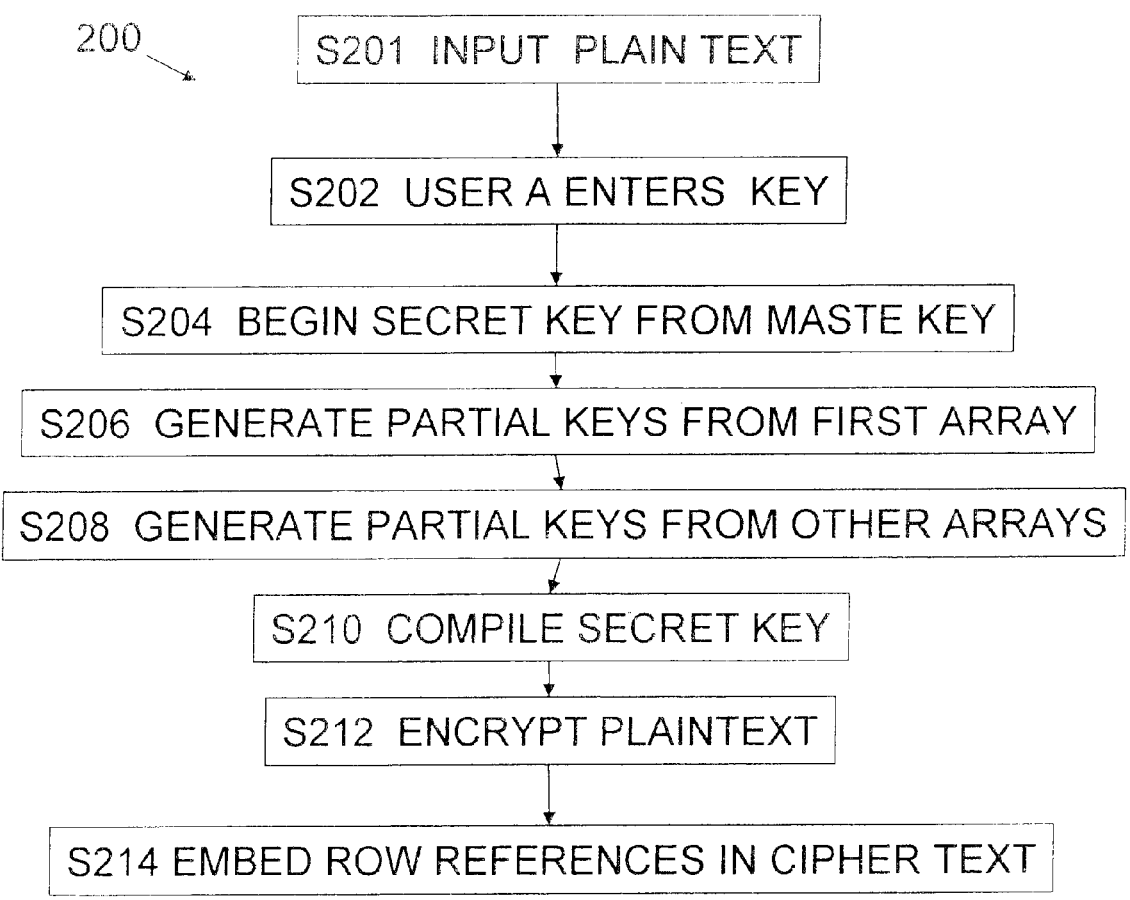
FIG. 6 is a flow chart of the process of encrypting a row of data.

In FIG. 6 is shown a flowchart 200 of the process of encrypting a row of plaintext. First at step S201 a row of plaintext is entered via plaintext input 22. As previously discussed this can be via an external system or inputting manually via user by appropriate means. In this example the row of plaintext is 'Mr Smith eats his chips'.

Step S202 may be necessary to reproduce the a master key by having each of the users enter their user keys. This step is not necessary if the master key is stored.

Next at step S204 the process is begun of generating a secret key for that row of plain text. First the master key is added which in this case is 'PATRICK'. At step S206, the specific template 40' is used in conjunction with the partial key database 24. Starting from using column 51 and starting with row 52 a partial key is found from columns 44 and 50 as listed in cell 76. First the encryption server 20 accesses partial database 24 looks at array A 90, column 44. A random number generator then generates a number between one and one thousand and twenty four and takes the characters in that column in the row corresponding to the generated number. In this example random generator chose the number 75 and therefore picks ABCDE and adds this to the master key. The same is then done for array 80 in column 50 but a new random number is generated and therefore an entirely different row is used. In this example number 76 is picked and therefore 12 is added to the key. At step S208 the same is then done for array B and array C each time looking to the partial key database 24 generating random numbers between 1 and 1000 and taking the characters from a particular row corresponding to the columns listed in column 54. In this example it generates the further information ABCDEFG 1234 AB and 123.

At step S210 all these partial keys and the master key is then added together to form the secret key which in this case is PATRICKABCDE12ABCDEFG1234AB123. Since each character is equivalent to five bits this is equivalent to 150 bit key. If the key is shorter than 128 bits then it can be padded to the required length in a conventional manner.

At step S212 an encryption algorithm is used on the plaintext using the secret key as the key for encryption. In preferred example AES 128 is used. Since AES 128 requires a minimum key of 128 bits when template 40 is constructed or when specific template 40 possibility is created it is ensured that the random length of each of the columns referred to in column 54 add up to the sufficient length to generate 128 bit or greater key. Alternatively the key maybe padded to the required length in a conventional manner.

This generates a ciphertext which in this example might be ABC0E55D6678G7H9J5K7L8P4M6R4D45P99H8K7B4C6XW.

At step S214 references to the partial keys are embedded within the ciphertext. In order to do this the start positions listed in the random array start position column 53 are used. In this example the first start position is position 4 and therefore after the 4$^{th}$ character which in this case is a 0 the encryption server 20 inserts an identifier corresponding to the first partial key from column 44 of array A. This could be the partial key itself which in this case was 'ABCDE' but preferably is an identifier to the partial key in order to make it harder for any third party to attempt to compile the key by looking at the ciphertext. One suitable identifier is the row number which in this case was 75. Next the encryption server moves to position number 10 in the ciphertext and inserts the reference to the second partial key and continues this process for the other start positions in column 54. Where the row number is inserted within the ciphertext preferably the row number is placed in an ordered form using the same character based system as used in the number generation. So in this case we are using base 32 system such that the reference comprises both numbers and letters. This makes it more difficult for a third party to judge which parts of the ciphertext are the encrypted form of the plaintext and which are the references to partial keys.

The ciphertext with inserts will read ABC075E55D661278G7H9J5K7L 8P4M6R4D45P99H8K7B4C6XW is inserted into the ciphertext database as 26. No record of the secret key is kept.

Figure 7:
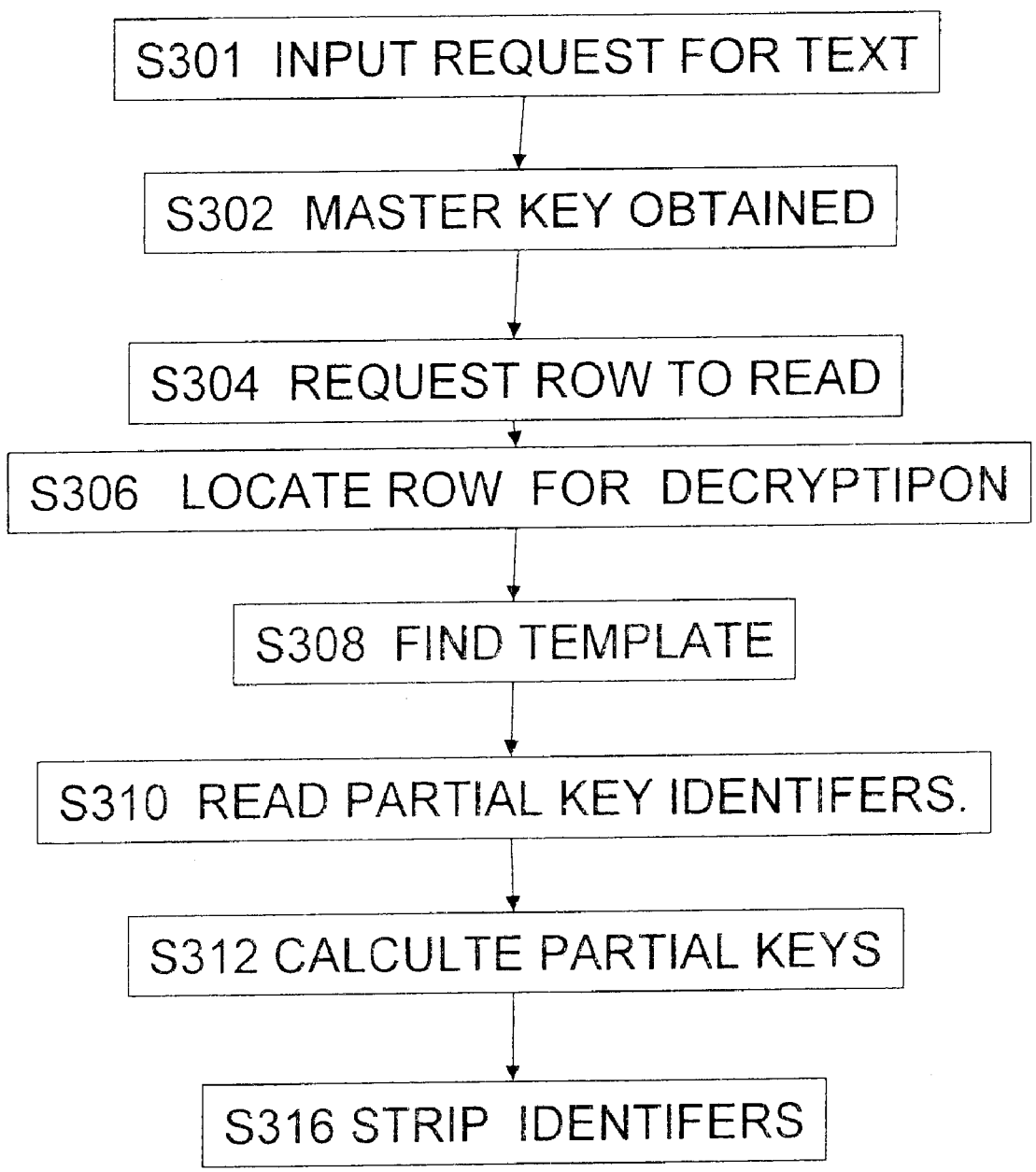
FIG. 7 is a flow chart of the process of decrypting a row of data.

In FIG. 7 is shown a flowchart process of decrypting a line of ciphertext stored in database 26. In the example given the same ciphertext equivalent to the same text given in the example above will be used.

At Step 300, the User requests to read a row of ciphertext in decrypted form. At Step 302, the Master Key is obtained. The manner in which this is obtained depends on how it is stored in the process described in Process 100. If they Key was stored in the memory, then it can be taken from this, if it was displayed on a screen to a user, then the user can take it from their own human memory and enter the key via user input 23. In a preferred form however all three users representing each of user server A 12, user server B 14 and user server C 16 need to be present. Each of the representatives then enters their user keys in the same manner as they did in process 100 from this servers 12, 14 and 16 or via user input 23. The master key calculator then recalculates the master key from these user keys and the stored random values from Step 110.

The master key is sent to encryption server 20 at step S304 along with a request for the row of text that is wished to be read, in the example given only one particular row is read. However, the process 200 described is repeated for each row input from the plain text input 22 with different random numbers being generated each time equivalent to two will be in the partial key database 24. It is possible to request for even more than one row at once since the master key will be the same for each.

At Step S306 the required row is located either by the external system or by encryption server 20 itself and is sent to encryption server 20 for decryption. At step S308 the decryption server 20 finds the specific template 40' equation which was used for encryption of that row. If there is more than one specific template used then a reference to the specific template used can be embedded into the ciphered text in a similar manner to the partial keys in suitably obscure format. At Step S310 column 53 is then used to find its 6 start positions with the known length of the identifier used to read the identifier's voyage to the partial key. In this case, cell 78 tells the server 20 to go after character 4 and it therefore takes the next 4 digits which are 0075 as a partial key. This is then repeated for each of the starting positions along the row of ciphered text. At step S310 the server 20 then uses these identifiers in combination with column 51 to locate the partial keys. It uses the column reference from column 51 together with the row reference from within the ciphered text to locate the specific cell within an array in partial key database 24. In the simple examples given whereby the partial key itself is stored in the data then this step can be skipped.

At step S314 the secret key is compiled from the master key obtained at step 302 together with the partial keys calculated at step s312 from the identifiers in the ciphered text. At step s316 the key identifiers are stripped out of the ciphered text leaving just an encrypted version of the plain text. Finally, at step s318 the encryption given is used to decrypt the text using the compiled secret key. In the further example this uses AES128 which is a symmetric key system, and therefore the secret key that is compiled is PATRICKABCDE12ABCDEFG1234AB123 and results in the encrypted text value ABC0E55D66 being decrypted into plain text which reads "

"Mr Smith eats his chips".

When more than one row is used, the steps 304-316 are repeated for the different rows using the same master key from step s302.

When identifiers for specific tasks are used for, for example the master key random number from process 100 or specific template 40' are used, the identifier can specify the exact date or maybe even time and date on which the data was entered into the system and encrypted for that task. Whether a user has chosen to use a new key, new master key or new specific template for a new task, it is also possible to use an entirely new template 40 with a new set of values in the partial key database 24. Once this is done, preferably all of the previous data created in the partial key database 24 is kept.

Advantageously each row of text uses a different key and therefore even if the same row text is entered twice the ciphertext which is entered into database 26 will be entirely different. Accordingly no patterns can be detected and a hacker using computer X to access ciphertext databases 26 cannot enter dummy lines of text in order to try and look at changes in the ciphertext. Additionally if the hacker managed to work out a key for a particular row this will not be useful for any other rows. Further none of the user keys A B and C are useful in themselves for decryption and have to be used together and inserted with the encryption server 20 in combination with the partial key database 26. In a preferred form even if the hacker was somehow to work out which parts of the ciphertext were identifiers these would be meaningless without both template 40' and the arrays values in partial key database 26. Preferably all of the values stored in encryption memory 28 and possibly encryption database 26 have some encryption algorithm applied to them separately which needs decrypting. For the fundamental data in encryption memory 28 a higher standing encryption such as AES256 can be used.

Advantageously the key used requires components equating to data embedded in the ciphertext and a master key component which is unrelated to it based on user keys provided by separate users and/or stored in a separate location. Accordingly working out either the master key or the partial keys in data is not useful by themselves and both of them must be calculated before a single row can be decrypted.

The invention claimed is:

1. A system comprising a computer for encrypting data, wherein the computer is configured to:
encrypt a plurality of data entries using at least one encryption algorithm, comprising using a first key to encrypt a first data entry, and using a second key to encrypt a second data entry;
embed a first identifier corresponding to at least part of the first key in a first key position within the encrypted data of the first data entry;
embed a second identifier corresponding to at least part of the second key in a second key position within the encrypted data of the second data entry; and
store in a system memory or transmit for storage in an external memory the encrypted data corresponding to each entry, including the corresponding embedded identifier, such that when decrypting a data entry in the system or external memory the associated identifier can be used to locate at least part of the correct key for decrypting that data entry.

2. The system according to claim 1 wherein an identical string of characters is used as part of the key for at least two data entries.

3. The system according to claim 2 wherein the identical string is used as part of the key for each entry.

4. The system according to claim 1 wherein the computer is configured not to store an identifier with the encrypted data corresponding to the identical string.

5. The system according to claim 1 wherein the system is configured to store in the system memory or transmit for storage in an external memory the encrypted data corresponding to each entry along with a plurality of identifiers corresponding to a plurality of parts of the key used to encrypt it, such that when decrypting a data entry the associated identifiers can be used to locate at least parts of the correct key for decrypting that data entry.

6. The system according to claim 2 wherein the identical string and the part or parts of the key corresponding to the identifier or identifiers together form the complete key for the data entry with which the identifier(s) is associated.

7. The system according to claim 2 wherein the identical string is compiled from a plurality of user strings of characters, and the system is preferably configured to store reference to which parts of the user strings are used to form the identical string, such as the position of the first character and number of characters, in the system memory.

8. The system according to claim 7 wherein the identical key is stored in the system memory.

9. The system according to claim 7 wherein the system is configured to decrypt two or more data entries stored by the system and is configured so that when decrypting the user strings are required in order to be used together with the stored references to recompile the identical string to be used as part of the key for decrypting.

10. The system according to claim 1 comprising a database of strings of characters for use as at least parts of keys, the identifier for a data entry, and preferably each identifier for each entry, corresponds to a stored string that was used as at least part of the key for the entry associated with the, or preferably each, identifier.

11. The system according to claim 10 wherein the identifier(s) for a data entry comprises the at least part of a key.

12. The system according to claim 10 wherein the identifier(s) comprises a reference to the location of the at least part of key used with the database.

13. The system according to claim 10 wherein a string from the database is chosen randomly to form at least part of the key for each entry encryption.

14. The system according to claim 10 wherein the strings in the store are randomly generated preferably based on fixed input parameters which are preferably stored in the system memory.

15. The system according to claim 12 wherein a reference to the location, such as a table column number, in the database is in the system memory, preferably which is combined with an identifier for an entry, such as one that corresponds to a row number, in order to locate the at least part of a key for that entry when decrypting.

16. The system according to claim 1 where the identifier is stored in the same format as the encrypted data such as in alphanumeric format.

17. The system according to claim 1 wherein the system memory comprises a plurality of memory sources preferably with at least one memory source inside the computer and at least one remote from it connected by a communication path.

18. The system according to claim 1 wherein at least part of the keys are randomly generated.

19. A method of encrypting data comprising the steps of:
   using a computer to encrypt a plurality of data entries using at least one encryption algorithm,
   using a first key to encrypt a first data entry,
   embedding a first identifier corresponding to at least part of the first key in a first key position within the encrypted data of the first data entry,
   storing the encrypted data, of the encrypted first data entry, including the embedded first identifier in a memory,
   using a second key to encrypt a second data entry,
   embedding a second identifier corresponding to at least part of the second key in a second key position within the encrypted data of the second data,
   storing the encrypted data, of the encrypted first data entry, with the embedded second identifier in a memory, and
   storing the first key position and the second key position in a memory.

20. The method according to claim 19 wherein the encryption steps are repeated for multiple entries using a new key and identifier for each.

21. A method of decrypting data comprising the steps of:
   obtaining a position of an identifier within an encrypted data entry from a memory,
   locating a first identifier, corresponding to at least part of a key, embedded within encrypted data of the encrypted data entry, using the obtained position,
   determining a first key using the identifier,
   repeating the obtaining, locating and determining steps for a second encrypted data entry with second identifier and second key,
   using a computer to decrypt the data in the first and second entries using the determined keys.

22. The method according to claim 21 wherein more than two identifiers are located and the key compiled from more than two corresponding parts.

23. The method according to claim 21 wherein the decryption steps are repeated for multiple entries determining a new key from new identifier(s) for each.

24. The system according to claim 1 wherein the computer is configured so that the identifiers for more than one, and preferably each, of the plurality of data entries are embedded within the associated encrypted data entry in embedded positions, with the embedded positions being different for the different entries and either stored in the system memory of the computer or transmitted to be stored in external memory.

25. The system according to claim 1 wherein different identifiers are embedded at different positions within the encrypted data and the different positions are stored.

26. The method according to claim 19 wherein:
   the first key position and second key position are different corresponding to a different number of characters within the respective first and second data entries; and
   the first key position and second key position are stored separately in the memory.

27. The method according to claim 22 further comprising the steps of:
   locating a first identifier within a plurality of encrypted data entries corresponding to part of a key;
   determining a key from the part of the key corresponding to the first identifier with a predetermined partial key or a part of a key corresponding to a second identifier located within the encrypted data; and
   using the computer to decrypt the data using the determined key.

* * * * *